United States Patent
Ikeuchi et al.

(10) Patent No.: US 10,055,873 B2
(45) Date of Patent: Aug. 21, 2018

(54) IMAGE PROCESSING DEVICE AND IMAGE PROCESSING METHOD

(71) Applicant: THE UNIVERSITY OF TOKYO, Tokyo (JP)

(72) Inventors: Katsushi Ikeuchi, Tokyo (JP); Takeshi Oishi, Tokyo (JP); Taiki Fukiage, Tokyo (JP)

(73) Assignee: THE UNIVERSITY OF TOKYO, Tokyo (JP)

( * ) Notice: Subject to any disclaimer, the term of this patent is extended or adjusted under 35 U.S.C. 154(b) by 17 days.

(21) Appl. No.: 15/509,113

(22) PCT Filed: Sep. 7, 2015

(86) PCT No.: PCT/JP2015/075373
§ 371 (c)(1),
(2) Date: Mar. 6, 2017

(87) PCT Pub. No.: WO2016/039301
PCT Pub. Date: Mar. 17, 2016

(65) Prior Publication Data
US 2017/0256083 A1  Sep. 7, 2017

(30) Foreign Application Priority Data
Sep. 8, 2014  (JP) .................................. 2014-182629

(51) Int. Cl.
G06T 11/00 (2006.01)
G06T 11/60 (2006.01)

(52) U.S. Cl.
CPC .................... G06T 11/60 (2013.01)

(58) Field of Classification Search
None
See application file for complete search history.

(56) References Cited

U.S. PATENT DOCUMENTS

2013/0113973 A1* 5/2013 Miao ...................... G09G 3/003
348/333.01
2015/0153577 A1* 6/2015 Nikitin ............... G02B 27/2292
250/200

(Continued)

FOREIGN PATENT DOCUMENTS

JP  2007-121625 A  5/2007

OTHER PUBLICATIONS

Written Opinion issued in PCT/JP2015/075373; dated Nov. 24, 2015.

(Continued)

Primary Examiner — Delomia L Gilliard
(74) Attorney, Agent, or Firm — Studebacker & Brackett PC

(57) ABSTRACT

An image processing device is equipped with an image input unit, an arithmetic operation unit, and an α value updating unit. The image input unit accepts a first input image and a second input image that a virtual image has been superimposed on the first input image at a first transmittance. The arithmetic operation unit calculates, by comparison between results of operations performed on a composite image obtained by adding values that the first input image and the second input image have been respectively multiplied by a second transmittance and a value that the second transmittance has been subtracted from 1 and on the first input image, a visibility value at the second transmittance. The α value updating unit updates the second transmittance with a comparison between the visibility value and a target value. The arithmetic operation unit uses the updated second transmittance to recalculated the visibility value.

18 Claims, 3 Drawing Sheets

(56) References Cited

U.S. PATENT DOCUMENTS

| | | | |
|---|---|---|---|
| 2015/0235630 A1* | 8/2015 | Rasmusson | G09G 5/377 345/592 |
| 2015/0338658 A1* | 11/2015 | Davis | G02B 27/0172 345/8 |
| 2016/0035139 A1* | 2/2016 | Fuchs | G02B 27/017 345/633 |
| 2016/0187652 A1* | 6/2016 | Fujimaki | G02B 27/0172 345/8 |

OTHER PUBLICATIONS

International Preliminary Report on Patentability issued in PCT/JP2015/075373; dated Mar. 14, 2017.
International Search Report issued in PCT/JP2015/075373; dated Nov. 24, 2015.
Fukiage et al; Visibility-Based Blending for Real-Time Applications; IEEE International Symposium on Mixed and Augmented Reality 2014; Science and Technology Proceedings; Sep. 10-12, 2014; pp. 63-72 ; Munich, Germany.

* cited by examiner

IMAGE PROCESSING DEVICE AND IMAGE PROCESSING METHOD

TECHNICAL FIELD

Several aspects pertaining to the present invention relate to image processing devices and image processing methods.

BACKGROUND ART

In recent years, research and development of a technique which makes a real scene and virtual information visible simultaneously by displaying virtual objects and information on a wearable terminal such as a head mounted display (HMD), a spectacle-type wearable display and so forth make progress. In such a technique, there are many cases where a virtual image which shows the virtual objects and information is superimposed on the real scene (a background) which is visually recognized directly via the display or on a background image which is displayed on the display. In such a case, when the virtual image completely interrupts obstacles and so forth in the background or the background image, there are cases where a danger occurs when walking and so forth. Accordingly, there are many cases where the virtual image is superimposed on the background or the background image by making it translucent.

However, in a case where the virtual image is superimposed on it translucently, it is difficult to appropriately set the visibility of the virtual object of a drawing result. For example, in a case where the background image and the virtual image have been blended together in a fixed ratio by alpha blending and displayed, the visibility of the virtual image is remarkably lowered in cases where the brightness of the background and that of the virtual image are similar to each other and a texture of the background image is high in contrast.

In Patent Document 1, an image display device which can make the outside world see-through, the device which is equipped with means which displays an image and means which changes a display aspect of the image in accordance with an image which has been obtained by an imaging operation of receiving a light image of a photographic object is disclosed.

CITATION LIST

Patent Document

Patent Document 1: Japanese Patent Application Laid-Open No. 2007-121625

SUMMARY

Technical Problem

However, also in the method described in Patent Document 1, the display aspect is simply changed in accordance with the image of the photographic object. That is, nothing is considered as to how a post-composed image that the virtual image has been superimposed on the background or the background image is visually recognized by a user.

The several aspects of the present invention have been made in view of the aforementioned problems and to provide an image processing device and an image processing method by which the user can visually recognize the virtual image favorably is set as one of the objects.

Solution to Problem

An image processing device pertaining to one aspect of the present invention is equipped with input means which accepts inputs of a first input image and a second input image that a virtual image has been superimposed on the first input image at a first transmittance, arithmetic operation means which, by comparison between results of arithmetic operations performed on a composite image obtained by adding together values that the first input image and the second input image have been multiplied respectively by a second transmittance which is lower than the first transmittance and a value that the second transmittance has been subtracted from 1 and on the first image, calculates a value indicating the visibility at the second transmittance, and updating means which updates the second transmittance in accordance with a result of comparison between the value indicating the visibility at the second transmittance and a target value, in which the arithmetic operation means calculates again the value indicating the visibility by using the updated second transmittance.

An image processing device pertaining to one aspect of the present invention is equipped with input means which accepts inputs of a first input image, a second input image that a virtual image has been superimposed on the first input image at a first transmittance, and a third input image that a virtual image has been superimposed on the first input image at a maximum brightness, arithmetic operation means which, by comparison between results of arithmetic operations performed on a composite image obtained by adding together values that the second input image and the third input image have been multiplied respectively by a second transmittance and a value that the second transmittance has been subtracted from 1 and on the first image, calculates a value indicating the visibility at the second transmittance, and updating means which updates the second transmittance in accordance with a result of comparison between the value indicating the visibility at the second transmittance and a target value, in which the arithmetic operation means calculates again the value indicating the visibility by using the updated second transmittance.

An image processing method pertaining to one aspect of the present invention is equipped with the step of accepting inputs of a first input image and a second input image that a virtual image has been superimposed on the first input image at a first transmittance, the step of, by comparison between results of arithmetic operations performed on a composite image obtained by adding together values that the first input image and the second input image have been multiplied respectively by a second transmittance which is lower than the first transmittance and a value that the second transmittance has been subtracted from 1 and on the first image, calculating a value indicating the visibility at the second transmittance, and the step of updating the second transmittance in accordance with a result of comparison between the value indicating the visibility at the second transmittance and a target value, in which the arithmetic operation means calculates again the value indicating the visibility by using the updated second transmittance.

An image processing method pertaining to one aspect of the present invention is equipped with the step of accepting inputs of a first input image, a second input image that a virtual image has been superimposed on the first input image at a first transmittance, and a third input image that a virtual image has been superimposed on the first input image at a maximum brightness, the step of, by comparison between results of arithmetic operations performed on a composite image obtained by adding together values that the second input image and the third input image have been multiplied respectively by a second transmittance and a value that the second transmittance has been subtracted from 1 and on the first image, calculating a value indicating the visibility at the second transmittance, and the step of updating the second transmittance in accordance with a result of comparison between the value indicating the visibility at the second transmittance and a target value, in which the arithmetic operation means calculates again the value indicating the visibility by using the updated second transmittance.

A program pertaining to one aspect of the present invention makes a computer execute a process of accepting inputs of a first input image and a second input image that a virtual image has been superimposed on the first input image at a first transmittance, a process of, by comparison between results of arithmetic operations performed on a composite image obtained by adding together values that the first input image and the second input image have been multiplied respectively by a second transmittance which is lower than the first transmittance and a value that the second transmittance has been subtracted from 1 and on the first image, calculating a value indicating the visibility at the second transmittance, and a process of updating the second transmittance in accordance with a result of comparison between the value indicating the visibility at the second transmittance and a target value, in which the arithmetic operation means calculates again the value indicating the visibility by using the updated second transmittance.

A program pertaining to one aspect of the present invention makes a computer execute a process of accepting inputs of a first input image, a second input image that a virtual image has been superimposed on the first input image at a first transmittance, and a third input image that a virtual image has been superimposed on the first input image at a maximum brightness, a process of, by comparison between results of arithmetic operations performed on a composite image obtained by adding together values that the second input image and the third input image have been multiplied respectively by a second transmittance and a value that the second transmittance has been subtracted from 1 and on the first image, calculating a value indicating the visibility at the second transmittance, and a process of updating the second transmittance in accordance with a result of comparison between the value indicating the visibility at the second transmittance and a target value, in which the arithmetic operation means calculates again the value indicating the visibility by using the updated second transmittance.

Incidentally, in the present invention, "unit" and "means", "device", "system" do not simply mean physical means and also include cases where functions that the "unit" and the "means", the "device", the "system" have are implemented by software. In addition, the functions that one "unit" and "means", "device", "system" have may be implemented by two or more physical means and devices and the functions of two or more "units" and "means", "devices", "systems" may be implemented by one physical means and device.

DESCRIPTION OF EMBODIMENTS

Figure 1:
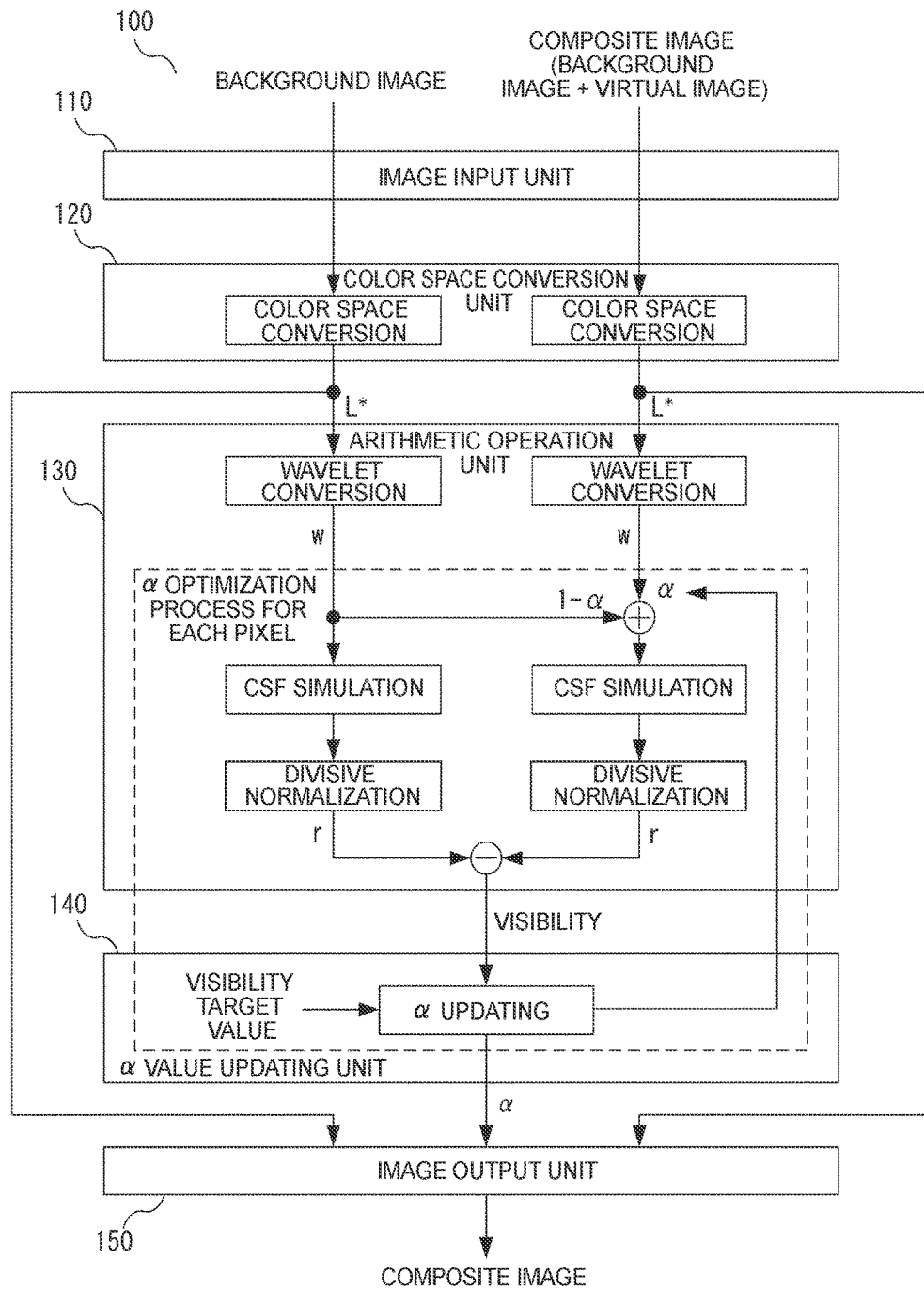
FIG. 1 is a block diagram illustrating a configurational example of an image processing device pertaining to one embodiment.

In the following, embodiments of the present invention will be described. In the following description of the explanation and the drawings to be referred, the same or similar symbols are respectively assigned to the same or similar configurations.

In the following, an image processing device which superimposes a virtual image on a background image will be described. Incidentally, although description will be made focusing on a case where the background image is an actual image and the virtual image is an image which has been generated by, for example, CG (Computer Graphics) and so forth, it is not necessarily limited to it. For example, the background image may be generated by CG and an image that an actual scene has been photographed may be used as the virtual image.

In a first embodiment, a process in a case of video see-through that the virtual image is superimposed on the photographed background image will be described. In addition, in a second embodiment, a process in a case of optical see-through that after the user has mounted an optical transmission type device such as, for example, the spectacle, the head mounted display and so forth having an image display function, the virtual image is displayed on the device concerned and the user visually recognizes the background directly by optical transmission will be described.

Incidentally, in the following description, although description will be made focusing on a case of image processing for video see-through and optical see-through, it is not necessarily limited thereto and it is also conceivable to apply the same processing to the image processing in general.

1. First Embodiment

As described above, in the first embodiment, the image processing device which performs video see-through that the virtual image is superimposed on the photographed background image will be described. A method (in the following, also called Visibility-based blending) by the present image processing device makes it possible to always obtain optional visibility, not depending on the brightness and the texture of the virtual image and the background image.

In a case where the virtual image is superimposed translucently on the background image, it is desirable that the virtual image can be displayed at a fixed visibility. However, a method of composing together two images with the subjective visibility being set as a standard is not yet established. As a method of composing together two different images, alpha blending is widely known. In the alpha blending, the transmittance of the virtual object can be changed by adjusting weight (an α value) of one image relative to the other image. In other words, the α value is a parameter which indicates the transmittance. However, the magnitude of the α value does not always correspond to the visibility of the blended virtual image. For example, in a case where the virtual image is composed on a real background image translucently, the visibility of the virtual image largely depends on the brightness and the textures of the background image and the virtual image. That is, even when the images are composed together with the fixed a value, the visibility of the virtual image largely fluctuates depending on the kinds of the background image and the virtual image.

In order to perform composition always at the fixed visibility not depending on the images to be composed together, it is favorable to optimize the α value which is used in composition by using a model which allows estimation of the visibility. Therefore, in the present embodiment, a visibility estimation model which has been developed for evaluation of the visibility of image compression noise and so forth which would generate in image compression and so forth is used by partially revising it. In a neurogenic property estimation model, nerve responses of the brain respectively to an original image and a distorted image are simulated and a difference between the responses is used as the magnitude of the visibility of distortion. Simulation of the nerve responses is performed on the basis of a calculation of an initial visual area (V1) of the brain. However, in the present embodiment, input images are replaced with the background image before composed with the virtual image and the image after composed and the visibility of the virtual image is given as a difference between the nerve responses to these images. Incidentally, the reason for use of the visibility estimation model which has been conventionally used for evaluation of the image compression noise and so forth by partially devising it lies in suppressing the calculation cost in order to make real-time arithmetic operation possible and obtaining favorable results.

In the Visibility-based blending pertaining to the present embodiment, the weight (the α value) in composition of the virtual image is optimized pixel by pixel such that the visibility of the virtual image approaches an optional level which has been determined in advance. Thereby, it becomes possible to compose together the images at the fixed and uniform visibility, not depending on the kinds of the background image and the virtual image.

In the following, a functional configuration of an image processing device 100 pertaining to the present embodiment will be described while referring to FIG. 1. The image processing device 100 includes an image input unit 110, a color space conversion unit 120, an arithmetic operation unit 130, an α value updating unit 140 and an image output unit 150. In the following, processes of them will be described.

The background image and a composite image that the virtual image has been superimposed on the background image are input into the image input unit 110. In the composite image which is input, the virtual image is superimposed on the background image with the α value=1, that is, in a nontransparent state. Here, it is supposed that the background image and the composite image are expressed in an RGB color space. Incidentally, if the α value in generation of the composite image is sufficiently large, it would not necessarily be 1.

The color space conversion unit 120 converts from the RGB color space to a CIE L✷a✷b✷ color space for both of the background image and the composite image which have been input. This is because the L✷a✷b✷ color space is designed such that perceptual uniformity is maintained and therefore it is more favorable than an expression method in a color space such as, for example, YUV and so forth.

The color space conversion unit 120 outputs only L✷ channel images of the background image and the composite image which are obtained from a result of this color space conversion to the arithmetic operation unit 130. That is, it ignores an a✷ channel and a b✷ channel which are equi-luminance color contrast components. This is because the sensitivity to the color contrast is small when compared with the sensitivity to the luminance and it is thought that the influence of the color contrast is not so large at least under a condition that the luminance contrast is present. Since the overall arithmetic operation amount can be reduced by ignoring the a✷ channel and the b✷ channel in this way, real-time calculation of the α value is made possible.

However, since there are cases where a preferable visibility estimation result is obtained rather when the color contrast has been taken into consideration depending on the situation, the color space conversion unit 120 may output the a✷ channel and the b✷ channel to the arithmetic operation unit 130. As a case where it is rather preferable to take the color contrast into consideration, for example, a case where although the luminance components (the L✷ channels) of the background image and the virtual image are almost the same (the luminance contrast is small) as each other, the color components (the a✷ channels and the b✷ channels) are greatly different from each other (the color contrast is large) is given. In such a case, since the visibility which has been calculated on the luminance channel is close to zero, the correct visibility estimation result can be obtained for the first time by taking the color contrast into consideration.

Accordingly, it is also conceivable that the color space conversion unit 120 makes the switch as to whether the color component is output to the arithmetic operation unit 130 or not in accordance with the magnitudes and so forth of the luminance contrast and the color contrast of the background image.

The arithmetic operation unit 130 is equivalent to processing of the visibility estimation model that visual processing in the initial visual area (V1) has been reproduced. In the arithmetic operation unit 130, a response of a neuron which corresponds to a sub-band component of each image is simulated, a difference in response of one neuron to the two input images is calculated pixel by pixel and the one that this difference has been pooled between the sub-bands is output as a value indicating the visibility. In the following, specific processes of the arithmetic operation unit 130 will be described.

First, in the arithmetic operation unit 130, first, a QMF (Quadrature Mirror Filter) wavelet conversion process is performed on the L✷ channel images of the background image and the composite image which have been input. The input images are linearly decomposed into the plurality of sub-bands by the QMF wavelet conversion and, as a result, a vector w which is constituted by 12 wavelet coefficients (four space frequency levels x three orientation components) and one DC component are obtained for each pixel of each input image.

Incidentally, in a case where the color space conversion unit 120 outputs not only the L✷ channel but also the a✷ channel and the b✷ channel, the arithmetic operation unit 130 performs the QMF wavelet conversion including these channels. As for whether the a✷ channel and the b✷ channel are taken into consideration, the same applies to a succeeding process regarding a contrast sensitivity function and so forth. In the following description, description will be made focusing on a case where only the L✷ channel is taken into consideration.

Next, the arithmetic operation unit 130 calculates the wavelet coefficients and the DC component of the composite image which has been composed with the α value concerned by the following formula, by using the initial value of the α value.

[Numerical Formula 1]

$$I = \alpha I_1 + (1-\alpha) I_2 \qquad (1)$$

Here, $I_1$ and $I_2$ indicate the wavelet coefficients or the DC components of the background image and the composite image (the image that the background image and the virtual image have been composed together with the α value=1) which have been input. Since the QMF wavelet conversion is linear conversion, the linear sums of the wavelet coefficients and the DC components which have been obtained here are equal to the wavelet coefficient and the DC component in a case where the two input images have been blended together with the current α value and thereafter have been subjected to wavelet conversion.

Next, the arithmetic operation unit 130 multiplies the 12 coefficients which are contained in the vector w of the wavelet coefficient by a linear gain S in accordance with the following formula and thereby reproduces the contrast sensitivity function (CSF: Contrast Sensitivity Function).

[Numerical Formula 2]

$$c_i = S_i w_i \quad (2)$$

Here, $c_i$ and $w_i$ respectively indicate the wavelet coefficients of an i-th filter after multiplied by the gain and before multiplied by it. $S_i$ is a gain for the i-th filter and is obtained by the following function.

[Numerical Formula 3]

$$S_i = S_{(e,o)} = A_o \exp\left(-\frac{(4-e)^\theta}{s^\theta}\right) \quad (3)$$

In this formula, e and o respectively indicate the numbers of a spatial frequency band and an orientation component, the spatial frequency band is defined as e=1, 2, 3, 4 from a high place to a low place and the orientation component is defined as o=1, 2, 3 respectively for horizontal, oblique, vertical ones. $A_o$ indicates a maximum gain in the orientation o. s is a width of the function and θ is a constant which determines sharpness of attenuation.

The arithmetic operation unit 130 performs a divisive normalization process on the wavelet coefficients so processed and obtains a contrast response r.

[Numerical Formula 4]

$$r_i = \text{sign}(c)\frac{|c_i|^\gamma}{\beta_i^\gamma + \sum_{k=1}^{n} H_{ik}|c_k|^\gamma} \quad (4)$$

In this formula, $\beta_i$ is a saturation constant for the i-th filter, prevents division by zero and determines a point that saturation of the response is started. $H_{ik}$ is a weighting function for determining the strength of suppression that a k-th filter imparts to the i-th filter. r is a constant.

It is assumed that, basically, the weighting function $H_{ik}$ becomes larger in weight (suppression works more largely) as the k-th filter has a characteristic which is closer to that of the i-th filter and it is defined by the following formula.

[Numerical Formula 5]

$$H_{ik} = H_{(e,o)(e',o')} = K \exp\left(-\left(\frac{(e-e')^2}{\sigma_e^2} + \frac{(o-o')^2}{\sigma_o^2}\right)\right) \quad (5)$$

(e, o) and (e', o') each indicates the spatial frequency level and the orientation that the i-th filter and the k-filter have selectivity. K is a constant which is determined such that the sum total of "$H_{ik}$"s relative to all "k"s becomes 1. $\sigma_e$ and $\sigma_o$ are constants which determine spreading of the weight respectively in a space frequency dimension and an orientation dimension.

Here, in the weighting function $H_{ik}$, actions from pixels in the vicinity of a pixel which is a processing object are not assumed. This is because every time accessing also to the surrounding pixels so as to obtain the visibility of each pixel is high in calculation cost and it is thought that the influence of the vicinity pixels is not always large in reproduction of the contrast response, considering it. Real-time calculation of the α value becomes possible by not taking the actions of the vicinity pixels into consideration in the divisive normalization process as in the present embodiment.

However, in a case where a calculator which is sufficiently high in operation speed is used and in a case where it is not always necessary to stick to the real-time arithmetic operation, it is also conceivable to make it into the weighting function $H_{ik}$ that also the influence of the vicinity pixels has been taken into consideration.

In addition, the arithmetic operation unit 130 calculates the response $r_L$ which is based on local brightness by the following formula also in regard to the DC component which is obtained from the result of wavelet conversion.

[Numerical Formula 6]

$$r_L = \omega W_L \quad (6)$$

Here, $w_L$ indicates a coefficient of a low pass filter and w is a linear gain for that coefficient. The reason why the response $r_L$ which is based on such brightness is taken into consideration in visibility is because in a case where both of regions where the background image overlaps the virtual image to be composed therewith have smooth surfaces, the visibility is underestimated and an error occurs in a result of blending. There exist many such smooth regions which are little in texture in natural images such as the sky, concrete walls, shaded and dark places and so forth.

The arithmetic operation unit 130 calculates the contrast response and the response to the local brightness pixel by pixel by using the formula (2), the formula (4) and the formula (6) similarly also in regard to the wavelet coefficients and the DC component of the background image which has been input.

Finally, the arithmetic operation unit 130 pools a difference between the response to the composite image by the current α value and the response to the background image pixel by pixel in accordance with the following formula and sets this as the current value of the visibility.

[Numerical Formula 7]

$$d_{xy} = \frac{1}{n+1}\left(|r_L - r_L'|^p + \sum_{i=1}^{n} |r_i - r_i'|^p\right)^{\frac{1}{p}} \quad (7)$$

Here, $d_{xy}$ indicates the difference in response which has been pooled in a pixel (x, y). $r_i$ and $r_i'$ indicate responses to the i-th filter respectively for the background image and the composite image by the current α value. n indicates the number of the filters and therefore here n=12. $r_L$ and $r_L'$ indicate responses to the local brightness respectively for the two images.

The α value updating unit 140 performs searching for the α value which is optimum for realizing the visibility which becomes a target (a target value) pixel by pixel. The searching is performed by the binary search method. The user can individually set the target value of the visibility.

More specifically, the α value updating unit 140 compares the value that the arithmetic operation unit 130 has calculated and which indicates the visibility when blended using the current α value and the value (the target value) which indicates the visibility which is the target, and when the current visibility is higher than the target, brings the α value down by the amount of a step size and when it is lower than it, brings the α value up by the amount of the step size. It repeats a process of updating the α value in this way and then outputting this α value to the arithmetic operation unit 130 so as to again make it arithmetically operate the value which indicates the visibility of the composite image by a predetermined number of steps (for example, 8 steps). At this time, the initial value of the step size can be set to, for example, 0.25. The value of this step size is reduced to half every time the step is advanced. The α value which is obtained after repeating it by the predetermined number of steps can be set as the optimum value which is obtained as a result of searching.

However, as aforementioned, since the α value is optimized pixel by pixel in the present embodiment, when it is used as it is, there are cases where discontinuity occurs between the pixels and it ends in an unnatural result. Thus, the α value updating unit 140 may make pixel-by-pixel changing of the α value smooth by averaging the α values of the respective pixels within a range of a square window of a fixed size.

The image output unit 150 performs blending of the background image and the composite image by using the optimum α value which has been calculated. The blending is performed on the $L*a*b*$ color space in accordance with the above formula (1) and the one which has been returned to the RGB color space after composition is output.

(1.2 Specific Example of Hardware Configuration)

Figure 2:
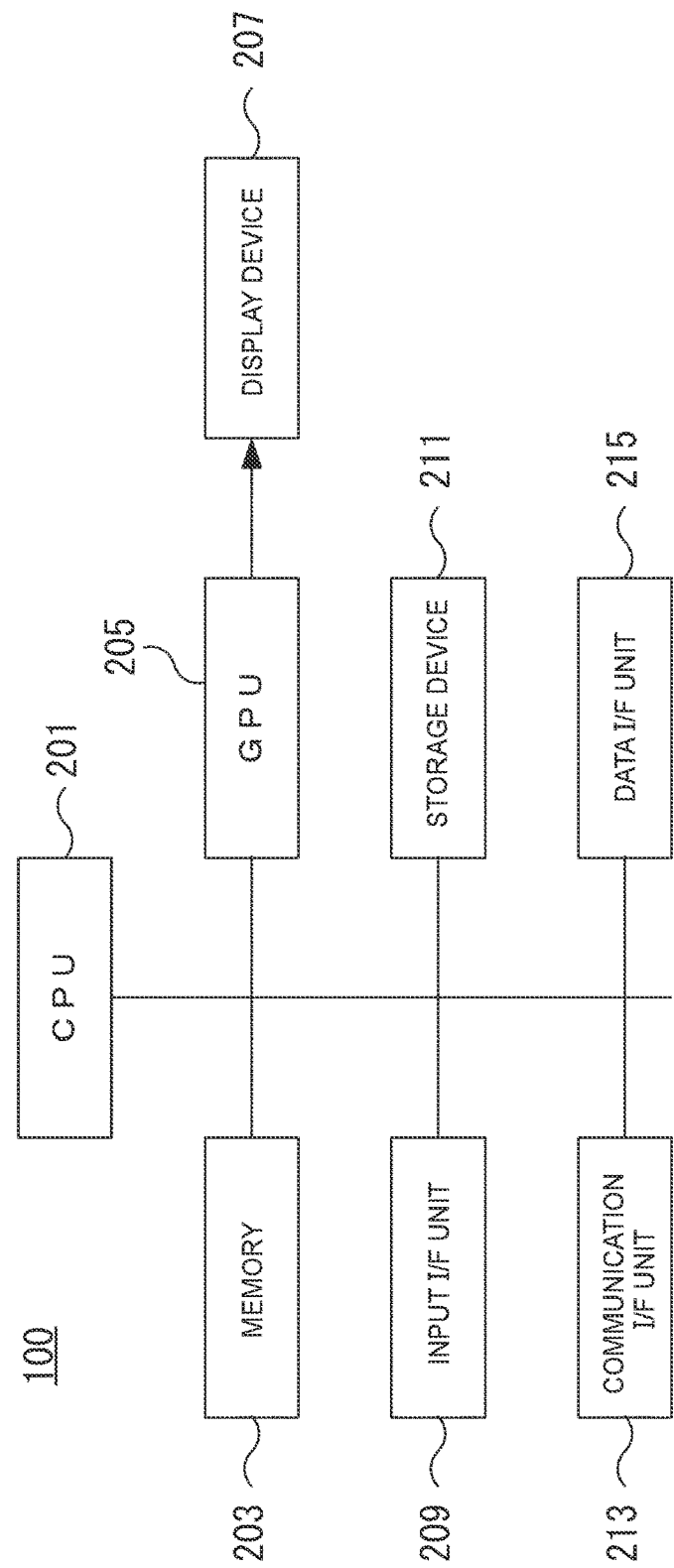
FIG. 2 is a block diagram illustrating a specific example of a hardware configuration on which the image processing device illustrated in FIG. 1 can be mounted.

In the following, one example of the hardware configuration in a case where the image processing device 100 which has been described above so far is implemented by a computer will be described while referring to FIG. 2. As illustrated in FIG. 2, the image processing device 100 includes a CPU (Central Processing Unit) 201, a memory 203, a GPU (Graphics Processing Unit) 205, a display device 207, an input interface (I/F) unit 209, a storage device 211, a communication I/F unit 213, and a data I/F unit 215.

The CPU 201 controls various kinds of processes in the image processing device 100. For example, the CPU 201 transfers a camera image (the background image) which becomes the basis of the input image in the process which has been described in FIG. 1 and is stored in the memory 203 to the GPU 205 and then can instruct the GPU 205 so as to perform the processes regarding generation of the composite image, optimization of the a value and so forth regarding the image concerned. The processes which are performed by the CPU 201 are temporarily stored into the memory 203 and then can be implemented as programs which operate mainly on the CPU 201.

The memory 203 is a storage medium such as, for example, a RAM (Random Access Memory) and so forth. The memory 203 temporarily stores program codes of the programs executed by the CPU 201 and data which includes background images and so forth which become necessary in execution of the programs.

The GPU 205 is a processor which has been installed separately from the CPU, for example, in order to perform image processing. All of the processes that the image input unit 110, the color space conversion unit 120, the arithmetic operation unit 130, the α value updating unit 140 and the image output unit 150 illustrated in FIG. 1 perform can be implemented on the GPU 205. In particular, if the programs pertaining to the arithmetic operation unit 130 and the α value updating unit 140 are implemented by a pixel shader which can perform programming in units of pixels, it will become possible to execute these processes in parallel with each other in units of pixels. Thereby, α value estimation that the image processing device 100 performs can be implemented in real time.

Figure 3:
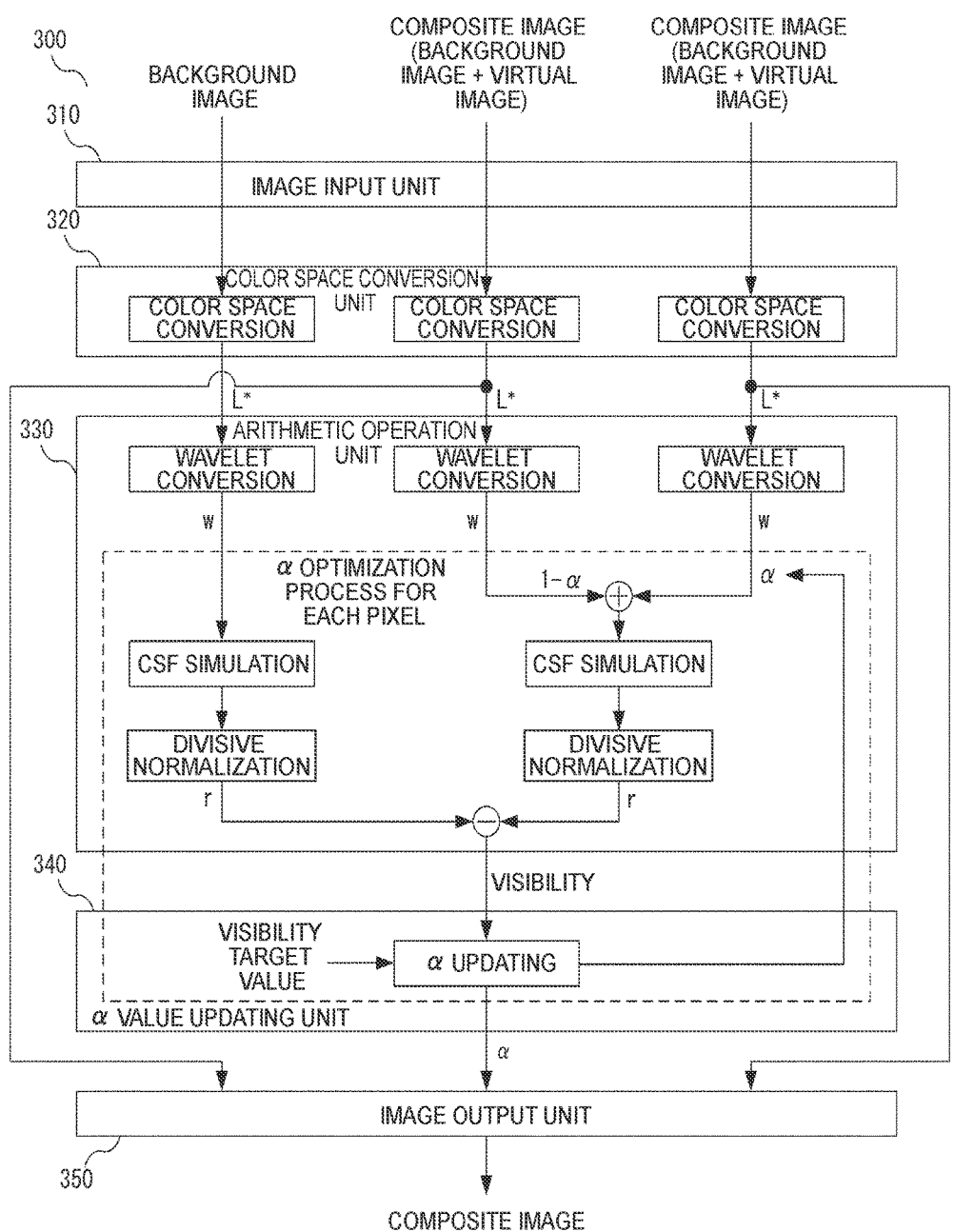
FIG. 3 is a block diagram illustrating a configurational example of an image processing device pertaining to one embodiment.

Besides, it becomes possible to perform also generation of the composite image that the virtual image is superimposed on the background image which becomes one of the input images at a predetermined transmittance (also including a case of the transmittance 1) in the processes in FIG. 1, FIG. 3 on the GPU 205.

The display device 207 is a device adapted to display the composite image and so forth that the GPU 205 has processed. As specific examples of the display device 207, a liquid crystal display, an organic EL (Electro-Luminescence) display and so forth are given in addition to the HMD. The display device 207 may be installed outside the image processing device 100. In this case, the display device 207 is connected to the image processing device 100 via, for example, a display cable and so forth.

The input I/F unit 209 is a device adapted to accept inputs from the user. For example, it is possible for the user to input the target value of the visibility that the α value updating unit 140 requires from the input I/F unit 209. As specific examples of the input I/F unit 209, for example, a keyboard, a mouse, a touch panel and so forth are given. The input I/F unit 209 may be connected to the image processing device 100 via a communication interface such as, for example, a USB (Universal Serial Bus) and so forth.

The storage device 211 is a nonvolatile storage medium such as, for example, a hard disk, a flash memory and so forth. The storage device 211 can store an operating system, various programs adapted to implement an image processing function using the GPU 205, the virtual images as composition objects and so forth. The programs and data which are stored in the storage device 211 are referred to from the CPU 201 by being down-loaded to the memory 203 as required.

The communication I/F unit 213 is a device adapted to perform data communication via a cable or radio between it and an external device of the image processing device 100 such as, for example, a not illustrated photograph device (a camera device) and so forth attached to the image processing device 100. In this case, the communication I/F unit 213 accepts the input of an image frame which configures a projected image which becomes the background image.

The data I/F unit 215 is a device adapted to input data from the outside of the image processing device 100. As specific examples of the data I/F unit 215, there are a drive device and so forth adapted to read the data which is stored in various storage devices. The data I/F unit 215 may be installed outside the image processing device 100. In this case, the data I/F unit 215 is connected to the image processing device 100 via the interface such as, for example, the USB and so forth.

(1.3 Effect Pertaining to the Present Embodiment)

It becomes possible to present the virtual image at the uniform visibility according to the visibility which has been set by using the Visibility-based blending pertaining to the present embodiment, not depending on the brightness, the texture and so forth of the background image.

(1.4 Altered Example)

Although in the above-mentioned embodiment, the favorable α value has been calculated by estimating the visibility mainly by taking only the luminance contrast (the $L*$ channel) into consideration, it is not limited to this. As described above, for example, in a case where there exists almost no difference in luminance (the $L*$ channel) between the composite image and the background image, that is, the luminance contrast is small, the visibility can be estimated more preferably rather when the color contrast (the $a*$ and $b*$ channels) has been taken into consideration. In such a case, it is conceivable to estimate the visibility by taking all of the three channels of $L*$, $a*$, $b*$ into consideration and to calculate the preferable α value. More specifically, the switch may be made as to whether the arithmetic operation is performed only on the $L*$ channel or the arithmetic operation unit 130 performs the arithmetic operation also including the $a*$ and $b*$ channels in accordance with, for example, whether the difference in the luminance channel is bellow a fixed threshold value or not.

In addition, in a case where both of the luminance components and the color components are different from each other between the background image and the composite image, the magnitude of necessity of the color component is changed depending on presence or absence of contrast masking. Specifically, in a situation that the contrast masking effect from the background image is high, when the visibility is calculated only on the luminance channel, the visibility is liable to be evaluated low. In such a situation, if the color of the virtual image is greatly different from that of the background image, the visibility obtained from the color channel will become large and therefore the visibility can be favorably evaluated by taking all channels of $L*$, $a*$, $b*$ into consideration.

2. Second Embodiment

Then, the second embodiment will be described. As described above, in the first embodiment, the image processing device which performs video see-through that the virtual image is superimposed on the background image which has been photographed has been described. In the second embodiment, an image processing device which performs optical see-through that the user sees the one that light in the real world and light which has been output from a device have been added together through a half mirror will be described. In the optical see-through, the virtual image is inevitably displayed translucently. Under such a situation, it is thought that also the texture and the structure of a part with which the virtual information overlaps in a real scene exert influence on the visibility of the virtual image, in addition to the intensity of the light which is incident from the real scene and the intensity of light that the device emits.

A method (in the following, Visibility-enhanced blending) by an image processing device pertaining to the present embodiment optimizes the brightness of the virtual image pixel by pixel such that the visibility of the virtual image which is displayed becomes more than or equal to an optional level which has been set in advance.

In the following, a functional configuration of an image processing device 300 pertaining to the present embodiment will be described while referring to FIG. 3. The image processing device 300 includes an image input unit 310, a color space conversion unit 320, an arithmetic operation unit 330, an α value updating unit 340 and an image output unit 350. In the following, processes of them will be described.

The image input unit 310 accepts three inputs of (A) a background image that a background that the user visually recognizes has been photographed, (B) a simulation result image that a projected image that the user will visually recognize in a state where a visibility improvement process is not performed has been estimated, and (C) a simulation result image that a projected image that the user will visually recognize in a case where the virtual image has been displayed at a maximum brightness has been estimated. The input image of (B) is generated by a process of adding a virtual object which has been multiplied by a to the one that the whole background image has been multiplied by (1−α). The input image of (C) is generated by maximizing the value of the $L*$ channel on the CIE $L* a* b*$ color space.

The processes that the color space conversion unit 320 and the α value updating unit 340 perform are the same as those of the color space conversion unit 120 in the first embodiment and therefore description thereof is omitted.

Also the process that the arithmetic operation unit 330 performs is basically the same as that of the arithmetic operation unit 130 in the first embodiment. However, the wavelet coefficients and the DC components which become objects on which the arithmetic operation unit 330 performs the CSF simulation are different from those therein. While in the first embodiment, $I_1$ and $I_2$ in the formula (1) were the wavelet coefficients and the DC components of the background image and the composite image, in the second embodiment, $I_1$ and $I_2$ are the wavelet coefficients and the DC component s that the wavelet conversion has been performed on the input images (C) and (B) on the $L* a* b*$ color space.

The image output unit 350 blends together the virtual image which is contained in the input image (B) and the vertical image (the virtual image which is contained in the input image (C)) of the maximum luminance on the $L* a* b*$ color space by using the α value which has been optimized by performing searching by the α value updating unit 340 by the predetermined number of steps of the amount of, for example, 8 steps and so forth and sets a result of returning this to the RGB color space as a final output.

In a case where it is presented on an optical see-through type device (a display device), composition of the background and the virtual image is physically performed by the half mirror. Accordingly, the image output unit 350 displays the virtual image of the optimized α value which has been output from the image output unit 350 on the display device.

One example of a hardware configuration in a case where the image processing device 300 which has been described above so far is implemented by the computer is the same as that of the first embodiment excepting that the optical see-through type device can be used as the display device 207.

Use of the Visibility-enhanced blending pertaining to the present embodiment makes it possible to raise the visibility of the virtual image up to an optional level, not depending on the brightness, the texture and so forth of the background.

REFERENCE SIGNS LIST

100: image processing device
110: image input unit
120: color space conversion unit
130: arithmetic operation unit
140: α value updating unit
150: image output unit
201: CPU
203: memory
207: display device
209: input interface unit
211: storage device
213: communication interface unit
215: data interface unit
300: image processing device
310: image input unit 320: color space conversion unit
330: arithmetic operation unit
340: α value updating unit
350: image output unit

What is claimed is:

1. An image processing device comprising:
input means which accepts inputs of a first input image and a second input image that a virtual image has been superimposed on the first input image at a first transmittance;
arithmetic operation means which, by comparison between results of arithmetic operations performed on a composite image obtained by adding together values that the first input image and the second input image have been multiplied respectively by a second transmittance which is lower than the first transmittance and a value that the second transmittance has been subtracted from 1 and on the first image, calculates a value indicating the visibility at the second transmittance; and
updating means which updates the second transmittance in accordance with a result of comparison between the value indicating the visibility at the second transmittance and a target value, wherein
the arithmetic operation means calculates again the value indicating the visibility by using the updated second transmittance.

2. The image processing device according to claim 1, wherein
the arithmetic operations by the arithmetic operation means and updating by the updating means are performed pixel by pixel.

3. The image processing device according to claim 1, wherein
the updating means updates the second transmittance by searching by a binary search method.

4. The image processing device according to claim 1, wherein
the value indicating the visibility relates to a contrast sensitivity function and a contrast response.

5. The image processing device according to claim 1, wherein
the arithmetic operation means
performs wavelet conversion on the first input image and the second input image, and
adds together values that a wavelet coefficient and a DC component regarding the first input image and a wavelet coefficient and a DC component regarding the second input image which are obtained from results of the conversions concerned have been respectively multiplied by the second transmittance and the value that the second transmittance has been subtracted from 1.

6. The image processing device according to claim 5, wherein
the arithmetic operation means
multiplies a value which is obtained from a result of addition by a gain, and
performs a Divisive Normalization process on the value which has been multiplied by the gain and thereby calculates a contrast response value.

7. The image processing device according to claim 1, wherein
the arithmetic operation means calculates a value indicating the visibility on the basis of luminance components of the first input image and the second input image.

8. The image processing device according to claim 1, wherein
the arithmetic operation means makes the switch as to whether the value indicating the visibility is calculated on the basis of only the luminance component or the value indicating the visibility is calculated on the basis of both of the luminance component and a color component in accordance with the first input image and the virtual image.

9. An image processing device comprising:
input means which accepts inputs of a first input image, a second input image that a virtual image has been superimposed on the first input image at a first transmittance, and a third input image that the virtual image has been superimposed on the first input image at a maximum brightness;
arithmetic operation means which, by comparison between results of arithmetic operations performed on a composite image obtained by adding together values that the second input image and the third input image have been multiplied respectively by a second transmittance and a value that the second transmittance has been subtracted from 1 and on the first image, calculates a value indicating the visibility at the second transmittance; and
updating means which updates the second transmittance in accordance with a result of comparison between the value indicating the visibility at the second transmittance and a target value, wherein
the arithmetic operation means calculates again the value indicating the visibility by using the updated second transmittance.

10. The image processing device according to claim 9, wherein
the arithmetic operations by the arithmetic operation means and updating by the updating means are performed pixel by pixel.

11. The image processing device according to claim 9, wherein
the updating means updates the second transmittance by searching by a binary search method.

12. The image processing device according to claim 9, wherein
the value indicating the visibility relates to a contrast sensitivity function and a contrast response.

13. The image processing device according to claim 9, wherein
the arithmetic operation means
performs wavelet conversion on the first input image, the second input image and the third input image, and
adds together values that a wavelet coefficient and a DC component regarding the second input image and a wavelet coefficient and a DC component regarding the third input image which are obtained from results of the conversions concerned have been respectively multiplied by the second transmittance and the value that the second transmittance has been subtracted from 1.

14. The image processing device according to claim 13, wherein
the arithmetic operation means
multiplies a value which is obtained from a result of addition by a gain, and
performs a Divisive Normalization process on the value which has been multiplied by the gain and thereby calculates a contrast response value.

15. An image processing method for the image processing device comprising:

the step of accepting inputs of a first input image and a second input image that a virtual image has been superimposed on the first input image at a first transmittance;

the step of, by comparison between results of arithmetic operations performed on a composite image obtained by adding together values that the first input image and the second input image have been multiplied respectively by a second transmittance which is lower than the first transmittance and a value that the second transmittance has been subtracted from 1 and on the first image, calculating a value indicating the visibility at the second transmittance; and the step of updating the second transmittance in accordance with a result of comparison between the value indicating the visibility at the second transmittance and a target value, wherein the arithmetic operation means calculates again the value indicating the visibility by using the updated second transmittance.

16. An image processing method for the image processing device comprising:

the step of accepting inputs of a first input image, a second input image that a virtual image has been superimposed on the first input image at a first transmittance, and a third input image that the virtual image has been superimposed on the first input image at a maximum brightness;

the step of, by comparison between results of arithmetic operations performed on a composite image obtained by adding together values that the second input image and the third input image have been multiplied respectively by a second transmittance and a value that the second transmittance has been subtracted from 1 and on the first image, calculating a value indicating the visibility at the second transmittance; and the step of updating the second transmittance in accordance with a result of comparison between the value indicating the visibility at the second transmittance and a target value, wherein the arithmetic operation means calculates again the value indicating the visibility by using the updated second transmittance.

17. A non-transitory storage medium storing a program which makes a computer execute:

a process of accepting inputs of a first input image and a second input image that a virtual image has been superimposed on the first input image at a first transmittance;

a process of, by comparison between results of arithmetic operations performed on a composite image obtained by adding together values that the first input image and the second input image have been multiplied respectively by a second transmittance which is lower than the first transmittance and a value that the second transmittance has been subtracted from 1 and on the first image, calculating a value indicating the visibility at the second transmittance; and a process of updating the second transmittance in accordance with a result of comparison between the value indicating the visibility at the second transmittance and a target value, wherein the arithmetic operation means calculates again the value indicating the visibility by using the updated second transmittance.

18. A non-transitory storage medium storing a program which makes a computer execute:

a process of accepting inputs of a first input image, a second input image that a virtual image has been superimposed on the first input image at a first transmittance, and a third input image that the virtual image has been superimposed on the first input image at a maximum brightness;

a process of, by comparison between results of arithmetic operations performed on a composite image obtained by adding together values that the second input image and the third input image have been multiplied respectively by a second transmittance and a value that the second transmittance has been subtracted from 1 and on the first image, calculating a value indicating the visibility at the second transmittance; and a process of updating the second transmittance in accordance with a result of comparison between the value indicating the visibility at the second transmittance and a target value, wherein the arithmetic operation means calculates again the value indicating the visibility by using the updated second transmittance.

* * * * *